June 30, 1942.  J. R. HILL  2,287,802
MANUFACTURE OF STORAGE BATTERIES
Filed April 29, 1940
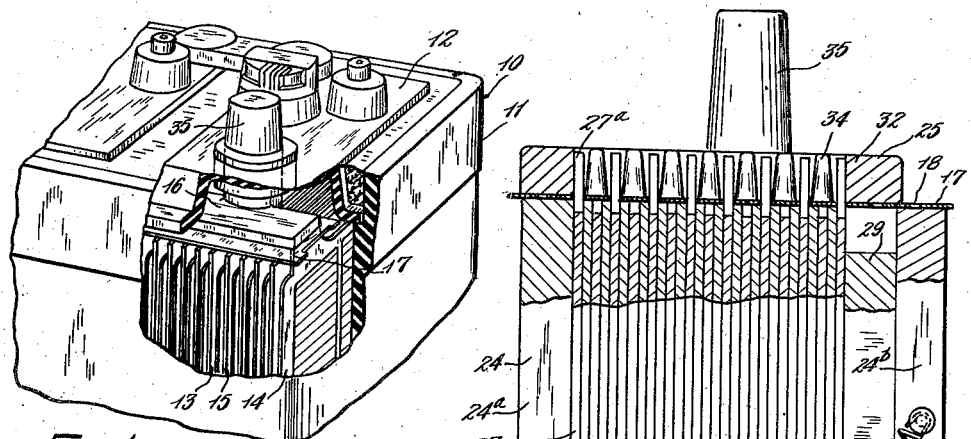
Fig. 1
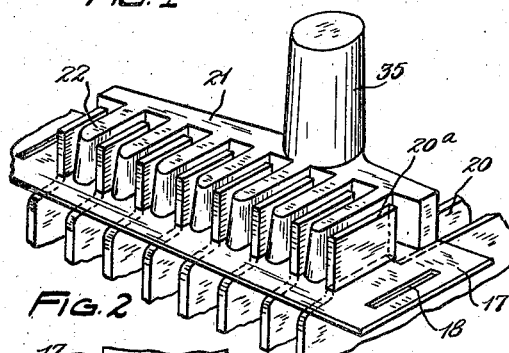
Fig. 2
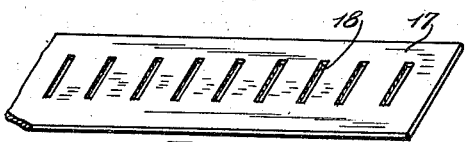
Fig. 3
Fig. 5
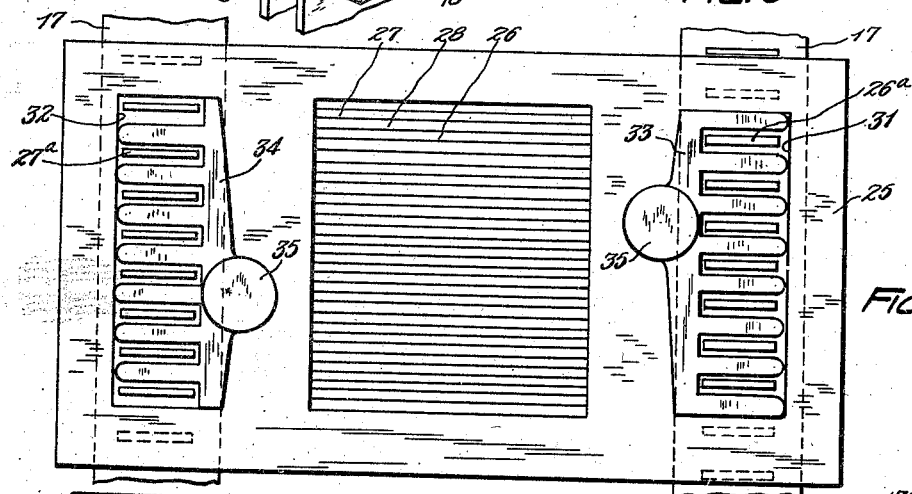
Fig. 4
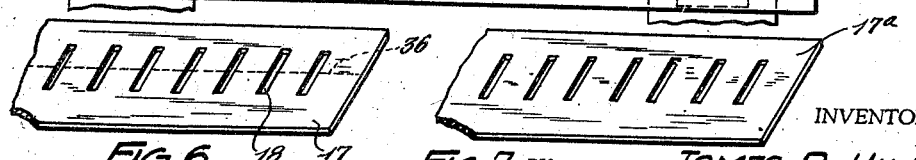
Fig. 6  Fig. 7
INVENTOR.
JAMES R. HILL
BY Kwis Hudson & Kent
ATTORNEYS Patented June 30, 1942

2,287,802

UNITED STATES PATENT OFFICE 2,287,802

MANUFACTURE OF STORAGE BATTERIES

James R. Hill, Cleveland Heights, Ohio, assignor to Willard Storage Battery Company, Cleveland, Ohio, a corporation of West Virginia Application April 29, 1940, Serial No. 332,180

2 Claims. (Cl. 136—176)

This invention relates to storage batteries, and more particularly to a novel method for assembling the same.

An object of my invention is to provide a novel method of assembling storage batteries in which battery plates, separators and connecting straps are preassembled into a completed battery element which is then transferred to its jar or cell.

Another object of my invention is to provide a novel method of assembling storage batteries in which positive and negative battery plates are prearranged with separators therebetween and the connecting straps lead-burned to the respective plate-groups to form a completed battery element, instead of lead-burning the connecting straps to separate groups of plates and thereafter interleaving the plates and separators to form a battery element, as has been done heretofore.

Still another object of my invention is to provide an improved method for assembling storage battery plates in which a slotted insulating strip is first applied to the lugs of the plates so that the lugs project through the openings of the strip and in which a connecting strap is then lead-burned to the lugs above the strip so that the latter serves to shield the plates from the heat of the lead-burning operation and to prevent particles of lead from dropping down between the plates.

Other objects and advantages of my invention will be apparent from the following description when taken in conjunction with the accompanying sheet of drawings in which:

Fig. 1 is a perspective view showing a storage battery with portions thereof broken away, the battery having my insulating strip embodied therein;

Fig. 2 is a perspective view showing a group of battery plates in position for lead-burning to a connecting strap and illustrating the use of my slotted insulating strip in such an assembly operation;

Fig. 3 is an end elevation, with portions broken away, showing assembling apparatus for use in constructing storage batteries according to my invention;

Fig. 4 is a plan view of the assembling apparatus shown in Fig. 3;

Fig. 5 is a perspective view showing a portion of the slotted insulating strip used in carrying out my invention;

Fig. 6 is a similar perspective view showing the insulating strip perforated longitudinally so that it can be separated into two sections by tearing; and Fig. 7 is another perspective view showing my insulating strip formed of rubber or equivalent moldable material.

Further reference will now be made to the accompanying drawing for the purpose of describing more in detail my battery assembling method. Although the improved assembling operations illustrated in the drawing are hereinafter described in considerable detail, it will be understood, of course, that the invention is not limited to the details described, but includes all variations of my method operations coming within the scope of the appended claims.

Before proceeding with the detailed description of the method steps and assembling apparatus illustrated in the drawing, it might be explained in a general way that my invention contemplates the use of a slotted insulating strip formed of paper or other appropriate material which is applied to the lugs of a group of storage battery plates and which serves the very useful purposes of holding the plates in properly spaced relation for lead-burning a connecting strap to the lugs; shielding the plates from the heat of the lead-burning operation; and preventing particles of lead from dropping down between the plates. This insulating strip can be removed from the completed battery element or plate group, or can be left on the element and thus incorporated in the completed storage battery. When the insulating strip is left on the battery element it extends between the strap connecting the plates of one polarity and the tops of the plates of the opposite polarity and prevents accidental short-circuiting engagement between such plates and strap. This insulating strip, as will be presently explained, can be used with or without a lead-burning form and can be used with various other means or devices for holding the battery plates to which the strip is to be applied.

In Fig. 1 I show a storage battery 10 comprising a container 11 having a plurality of cells or compartments provided with the usual covers 12 and containing battery elements formed of positive and negative plates 13 and 14 alternately arranged with insulating separators 15 between adjacent plates. The battery plates 13 and 14 are of the type having upstanding lugs projecting therefrom substantially in rows and connected by connecting straps 16 of the usual type lead-burned thereto. The positive and negative plates 13 and 14 of the battery 10 have my slotted insulating strip applied to the lugs thereof, the insulating strip 17 applied to the lugs of the negative plates 14 being visible in the battery, as illustrated in Fig. 1.

This insulating strip may be formed of paper, cloth, fibre, hard rubber, latex, or various plastics or any other suitable material, and, as shown in Figs. 5, 6 and 7, may comprise an elongated sheet or strip having a series of openings therethrough. Since the lugs of the battery plates are usually in the form of flat ears, the openings of the strip 17 are shown in the form of slots 18 extending transversely of the strip, although openings of any other desired shape could be used.

When the strip 17 is incorporated in the finished battery, as shown in Fig. 1, it extends transversely across the tops of the plates and the separators but lies beneath the connecting strap 16 to which the lugs of one group of plates are lead-burned. In this position the strip 17 serves as an insulating means which will prevent short-circuiting in the event that jarring of the battery should cause the plates 13 to accidently come into engagement with the underside of the strap 16.

I have already indicated that the insulating strip 17 serves a very useful purpose in assembling battery plates and different ways in which the strip can be thus used will next be explained. In Fig. 2 I show one way of using the insulating strip 17 in which a plurality of battery plates 20 are arranged in a group in substantially parallel relation with the lugs 20a thereof disposed substantially in a row. The plates may be supported edgewise by any suitable supporting means, such as a trough or the like, and when the strip 17 is applied to the lugs 20a so that they extend through the slots 18, the plates will be held properly spaced and the lugs will be aligned in proper relation for lead-burning to the connecting strap.

After the strip 17 has been applied to the lugs of a group of plates, as shown in Fig. 2, a connecting strap of any appropriate form may be placed in a position adjacent the lugs and overlying the strip 17 and can then be lead-burned to the lugs or the lug portions projecting above the strip. In Fig. 2 I show one form of connecting strap 21 which may be used and which has a comb portion comprising teeth 22 spaced and arranged to project between the pairs of lugs 20a of the plates 20. When the connecting strap 21 is in position for lead-burning, it rests on the strip 17, as shown in Fig. 2, and during the lead-burning operation the comb portion and the lugs of the plates are fused into a solid mass, such as that represented by the connecting strap 16 of the battery shown in Fig. 1.

During the lead-burning operation by which the strap 21 is united to the lugs of the plates 20, the strip 17 holds the lugs in properly spaced and aligned relation as mentioned above, and also shields the plates against damage from the heat of the lead-burning operation. This strip also prevents particles or streams of lead from dropping down between the plates which heretofore has at times resulted in short-circuiting of the battery plates.

In Figs. 3 and 4 I show another way of using the insulating strip 17 wherein the strip is used in conjunction with other assembling apparatus. The apparatus illustrated in Figs. 3 and 4 comprises a plate holder 24 and a burning form 25. The plate holder may comprise a trough-like structure having laterally spaced walls 24a and 24b adapted to receive therebetween a plurality of alternately arranged positive and negative battery plates 26 and 27 and a plurality of insulating separators 28 disposed between adjacent plates. When the plates and separators are placed in the holder 24 they are arranged in the relative positions which they occupy in the finished battery so that after the connecting straps have been lead-burned to the lugs of the positive and negative plates, the completed unit or battery element can be transferred from the holder 24 to the battery container.

The holder 24 may be constructed of a width to accommodate plate groups containing the largest number of plates expected to be encountered in manufacture and when groups containing a lesser number of plates are to be assembled, a filler block 29 may be placed between the end plate and the side wall 24b. For applying a suitable pressure to the plates and separators to maintain the same in compact relation while they are in the holder, I may provide for swinging or shifting of the wall 24b and may provide spring means, such as the tension spring 30, for urging the movable wall in a direction to squeeze or compress the group of plates and separators.

The burning form 25 may comprise a plate-like member having openings 31 and 32 therethrough which are spaced longitudinally of the form to correspond with the spacing which the connecting straps of the completed battery element are to have. These openings are of a size and shape to snugly receive and accurately position the connecting straps which are to be lead-burned to the lugs of the plates 26 and 27, such as the comb-type of straps 33 and 34 shown in Fig. 4. The accurate spacing and location of the connecting straps during the assembling operation is important because when the completed battery element is transferred to the battery container, it is desirable to have the posts 35 of the connecting straps so located that they will project through the openings of the cell covers.

In the use of the assembling apparatus just described the desired number of positive and negative battery plates 26 and 27, and insulating separators 28, are placed in the holder 24 so that the lugs 26a of the positive plates are disposed substantially in a row and the lugs 27a of the negative plates will be disposed in a similar row adjacent the opposite end of the plate group. The plates and separators as thus arranged are subjected to lateral pressure by the movable wall 24b of the holder to take up space existing between the plates and separators and to compress the group to a thickness or compactness corresponding to that desired for the finished battery element and which will permit the element to be freely inserted into a cell of the battery container.

When the plates and separators have been thus arranged slotted insulating strips 17 are applied to the lugs of the two groups of positive and negative plates. As shown in Figs. 3 and 4, the strips 17 extend transversely of the holder 24 and the plates and separators therein are pressed down onto the lugs of the plate groups so that the strips rest on the tops of the separators, which extend slightly above the tops of the plates, with the lugs projecting through the slots 18 of the strips. In applying the strips in this manner the lugs of the positive and negative plates will be lined-up in rows, after which the burning form 25 is placed on the holder 24 so that the openings 31 and 32 of the form overlie the strips 17 and the rows of lugs 26a and 27a project into these openings. The connecting straps 33 and 34 are then inserted into the openings 31 and 32 so that they rest upon the strips 17 with their teeth extending between the pairs of lugs.

While the connecting straps are thus supported and held in proper relation to the plates they are lead-burned to the lugs. During this lead-burning operation the strips 17 and separators not only support the connecting straps, but the strips shield the plates and separators from damage by the heat of the lead-burning operation and also prevent drops or streams of lead from falling down between the plates. In addition to holding the connecting straps in proper position during the burning operation so that the operator can use both hands to manipulate his torch and bar of lead, the burning form also tends to carry away excessive heat thereby causing quicker solidification of the lead and thus speeding up the assembling operation.

After the lead-burning of the connecting straps to the lugs, as just explained, the burning form is removed and the ends of the strips 17 can then be trimmed off at a point just beyond the end plates of the element. The battery element is then ready to be transferred to a battery container or otherwise disposed of.

Instead of using a slotted insulating strip formed of paper or other fibrous insulating material, as shown in Fig. 5, I may employ in the above-described operations and in the above-described completed battery, an insulating strip 17a formed of hard rubber or other suitable moldable material, as shown in Fig. 7.

If it should be desirable to make use of my insulating strip or strips 17 during the assembling of battery plates but not desirable to have the strips incorporated in the finished battery, the strips can be torn or otherwise removed from the lugs of the plates after the connecting straps have been lead-burned thereto. To facilitate such removal of strips from the plate lugs, should this be desirable, I may form the strips with a longitudinally extending perforation or serration 36, as shown in Fig. 6, along which the strip can be torn or severed and thereby separated into two sections.

From the foregoing description and the accompanying drawing, it will now be readily understood that I have provided a novel method for assembling battery plates. By the use of my method the positive and negative plates can be prearranged with the separators therebetween and the connecting straps can be burned to the respective plate groups to form the completed battery element which is then transferred to its jar or container cell. It will also be seen that the use of my slotted spacing and insulating strip, facilitates and improves the assembling operation by lining up the plate lugs to receive the connecting straps and protecting the plates and separators from the heat of the lead-burning operation as well as preventing particles of lead from dropping down between the plates. It will also be seen that my insulating strip can either be retained on the assembled plates or removed therefrom, but when retained on the plates and incorporated in the finished battery, these strips serve as an insulating means to prevent short-circuits if accidental contact occurs between the plates of one polarity and the connecting strap of the opposite polarity.

While I have illustrated and described my improved method for assembling battery plates in a more or less detailed manner, it will be understood, of course, that I do not wish to be limited to the particular details herein disclosed, but regard my invention as including such changes and modifications as do not involve a departure from the spirit of the invention and the scope of the appended claims.

Having thus described my invention, I claim:

1. In the manufacture of storage batteries, the steps of providing a plurality of battery plates having projecting lugs, arranging the plates in a group with the lugs disposed substantially in a row, applying a slotted and longitudinally perforated strip to the plate group so as to cause said lugs to extend through the slots, lead-burning a connector to the lugs above the strip, and removing the strip from the plate group by parting the same along its longitudinal perforation.

2. In the manufacture of storage batteries, the steps of providing a plurality of battery plates having projecting lugs, arranging positive and negative plates alternately in a holder with the lugs of the positive and negative plates extending upwardly in different rows and with separators between adjacent plates, applying slotted insulating strips to the rows of lugs so as to cause the lugs to extend through the slots, providing a burning form having openings therein, applying said form to the plates so that said lugs project upwardly into said openings and said strips substantially close the bottoms of the openings, inserting connectors into said openings, lead-burning the connectors to said lugs, removing the burning form, and transferring the battery element thus produced to a battery container.

JAMES R. HILL.